Sept. 25, 1951          A. C. OMBERG          2,569,328

AUTOMATIC POSITION PLOTTER

Filed Jan. 23, 1946          4 Sheets-Sheet 1

Inventor
ARTHUR C. OMBERG

By Robert T. Killman
Attorney

Sept. 25, 1951   A. C. OMBERG   2,569,328
AUTOMATIC POSITION PLOTTER
Filed Jan. 23, 1946   4 Sheets-Sheet 4

Inventor
ARTHUR C. OMBERG

By Robert T. Killman
Attorney

Patented Sept. 25, 1951

2,569,328

UNITED STATES PATENT OFFICE 2,569,328

AUTOMATIC POSITION PLOTTER

Arthur C. Omberg, Baltimore, Md., assignor to Bendix Aviation Corporation, Towson, Md., a corporation of Delaware Application January 23, 1946, Serial No. 642,969

2 Claims. (Cl. 346—33)

This invention relates to position indicating means and more particularly to such a means which will automatically and continuously record on a chart of the area being traversed the position of a moving craft with respect to the earth's surface. The invention further contemplates the automatic derivation of position from information as to the bearings of two or more points of known location, or from information as to the bearing and distance of one such point.

In the navigation of both air and surface craft it is highly advantageous to provide the navigating or conning officer with a means for continuously and accurately indicating the track of the craft with respect to a map or chart of the area being traversed. Because of the high speeds of modern vessels, particularly those of aircraft, it is desirable that the information be instantaneously available in order that prompt action may be taken to correct a dangerous position or heading. It is desirable that the necessity for the manual taking and recording of bearings and position indications by the navigator or his assistant be eliminated if possible, in order to speed the availability of information, to reduce the chances for human error, and to keep personnel requirements to a minimum. It is also desirable, where automatic steering or course correcting equipment is utilized, to have a means from which course or position corrections may be derived for application to such equipment. It is further desirable, particularly in the case of aircraft, that position plotting equipment be kept to a minimum of weight and complexity, and require a minimum of attention from the members of the crew.

Many previous attempts have been made to satisfactorily indicate position by the use of information similar to that employed by this invention, and devices have been proposed for the purpose, which utilized crossed pointers or light beams as position indicating means.

However, such devices have been found to lack flexibility and the ability to satisfactorily and automatically produce a permanent indication or record of the craft's track. As the angle intercepted by the bearings becomes obtuse, the accuracy of crossed pointer or light beam systems decreases rapidly, and if permanent recording means are carried by the crossed pointer systems inaccuracies are introduced by frictional resistance of the recording means and consequent bending or deflection of pointers. Crossed light beam systems are unable to produce a recorded indication of position.

It is an object of this invention to provide a means for automatically and continuously plotting the position of a moving craft on a map or chart of the area being traversed.

It is another object of this invention to provide a means which will automatically plot the position of a moving craft from indications of the true bearing of a pair of known geographical points and the heading of the craft.

It is a further object of this invention to provide an automatic position plotting means which derives the rectangular coordinates of the position of a craft with respect to a chart of the area being traversed and translates them into a positional indication on said chart.

It is a still further object of the invention to provide a position plotting means which derives from the rectangular coordinates of a pair of known points in an area being traversed by a craft, the bearings of said points and the heading of said craft; a pair of voltages commensurate with the magnitudes of the rectangular coordinates of the position of said craft within said area and translates said voltages into movement of a position indicating means.

It is another object of the invention to provide a position plotting means which derives from the rectangular coordinates of a known point an area being traversed by a craft, and the bearing and distance of said point, a pair of voltages commensurate with the magnitudes of the rectangular coordinates of said craft within said area and translates said voltages into movements of a position indicating means.

It is yet another object of the invention to provide an automatic position indicating means which is simple of construction and economical of space and weight.

Other objects and advantages of the invention will become apparent from a consideration of the following description when taken in conjunction with the accompanying drawings, in which.

Figure 1:
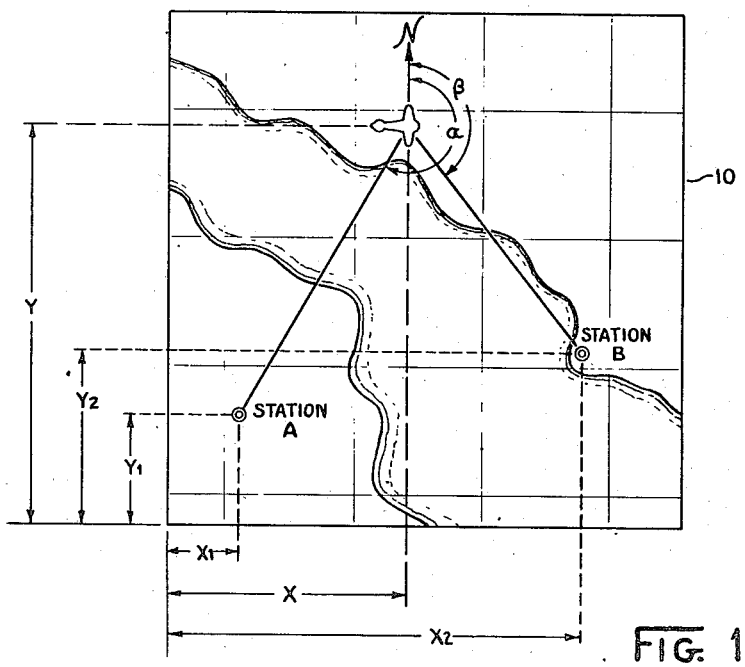
Fig. 1 is an illustration of a map or chart of an area traversed by an aircraft, indicating the relative positions of a pair of radio transmitting stations and the aircraft, and the trigonometric relationships of these positions which are utilized in one embodiment of the invention.
Figure 7:
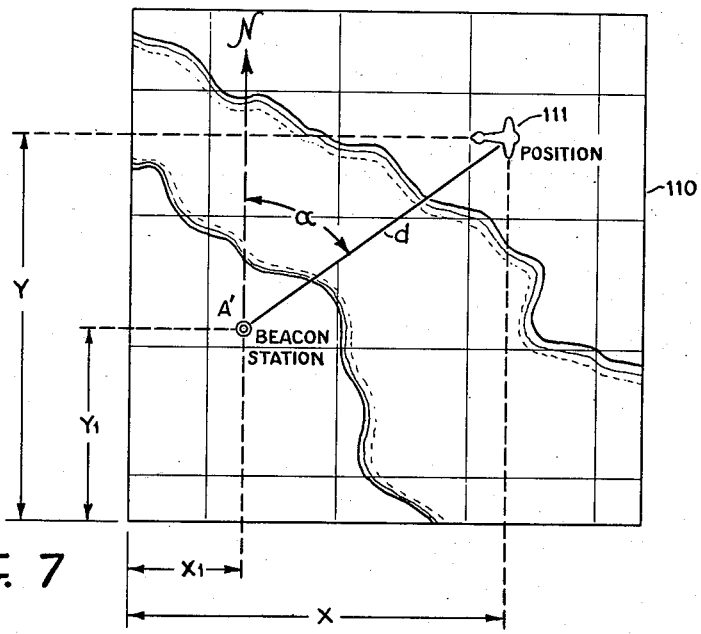
Figure 8:
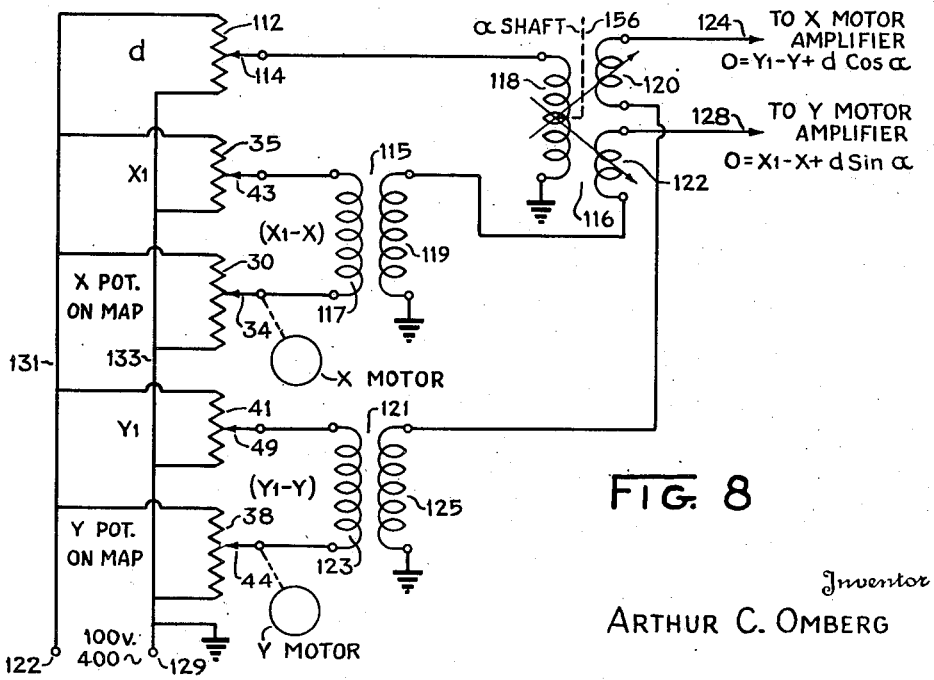

Fig. 7 is an illustration of a map or chart of an area being traversed by an aircraft, similar to that of Fig. 1, indicating the relative positions of a single beacon transmitting station and the aircraft, and the trigonometric relationships of these positions which are utilized in a second embodiment of the invention; and, Fig. 8 is a schematic diagram of circuits utilized in the computer of the second embodiment of the invention.

Referring now more particularly to the drawings, there is shown in Fig. 1 a representation of a map or chart 10 of a geographical area being traversed by an aircraft. There are indicated on the chart the locations of two radio transmitting stations which are marked station A and station B. The location of the aircraft with respect to the geographical area is indicated by a small representation of an airplane identified by the reference character 11. The rectangular coordinates of the craft 11 and of the stations A and B are indicated by the reference characters X, Y; X₁, Y₁, and X₂, Y₂; respectively. The true bearings of the stations A and B with respect to the craft 11 are indicated by the angle $\alpha$ and $\beta$ respectively.

The invention contemplates the use of the rectangular coordinates of the radio transmitting stations and the true bearings thereof with relation to the craft to develop, in a manner to be described hereinafter, voltages proportional to the rectangular coordinates of the position of the craft 11 in accordance with a voltage-distance scale applied to the respective lateral dimensions of the map or chart 10, and the driving thereby of a stylus or similar indicating means to a position comparable to the position of the craft 11 with respect to the chart 10.

Figure 3:
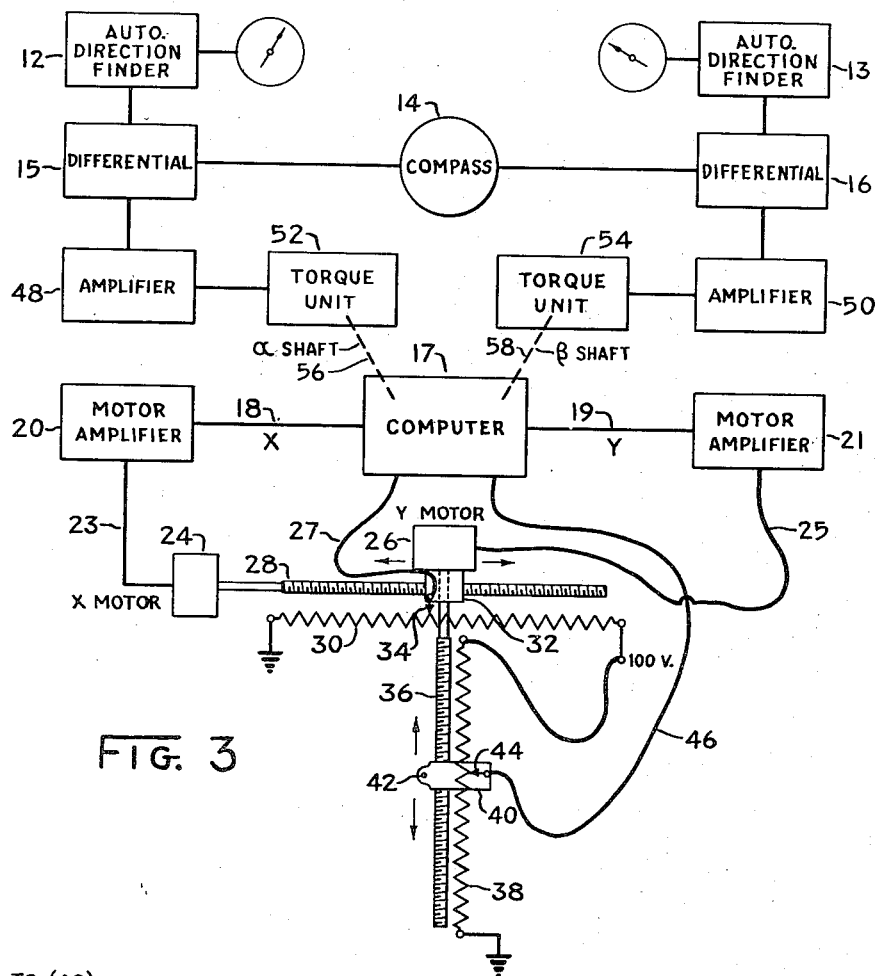
Fig. 3 is a schematic diagram of a system embodying the invention.

Figure 3 illustrates in schematic form a system embodying the invention for obtaining the information indicated in Figure 1 and utilizing it to derive an indication of the position of a craft with respect to the chart 10. Information as to the relative bearings of the stations A and B with respect to the craft is derived from the outputs of two automatic direction finders 12 and 13, which may be of types known to the art.

This information when combined with the heading of the craft as obtained from a magnetic or a flux gate compass, and corrected for variation and deviation will result in information as to the true bearing of the stations A and B with respect to the craft. In the system illustrated in Fig. 3 the output of the automatic direction finders 12 and 13 and of the magnetic or flux gate compass 14, properly corrected, may be electrically transmitted by self synchronous generators, which may be of the type known to the art as "Autosyn" generators, to the differential "Autosyn" motors 15 and 16 respectively. The outputs of the differential "Autosyns" 15 and 16 are fed by way of amplifiers 48 and 50, and torque amplifiers 52 and 54 respectively to a computer 17, which will be more fully described hereinafter, in which, from these outputs together with voltages proportional to the rectangular coordinates of the stations A and B with respect to an arbitrary voltage-distance scale assigned to the corresponding lateral dimensions of the map 10, there are derived control voltages proportional to the rectangular coordinates X and Y of the position of the craft. The control voltage which is proportional to the coordinate X is applied through conductor 18 to motor amplifier circuit 20 which amplifies this voltage and applies it to the X motor 24. The control voltage proportional to the coordinate Y is applied thru conductor 19 to motor amplifier 21. The motor 24 drives the lead screw 28 on which is mounted a cursor 32 and which extends parallel to the horizontal edges of the chart 10. Extending parallel to the lead screw 28 and in proximity thereto is a potentiometer 30. The potentimeter 30 extends across the full horizontal width of the chart 10, and has applied across it a voltage proportional to the chart distance spanned by the potentiometer, in terms of the arbitrary voltage-distance scale. Such a scale may, for example, set two miles equal to one volt, so that a potentiometer spanning two hundred miles of chart distance would have one hundred volts impressed across it. The cursor 32 carries a sliding contact 34 which travels along the potentiometer 30 in contact therewith. The contact 34 is connected with the computer 17 by means of a conductor 27.

The cursor 32 has mounted thereon for movement therewith a motor 26 driving a lead screw 36 which extends parallel to the vertical sides of the chart. Also mounted for movement with the cursor 32 is a potentiometer 38 extending parallel to the lead screw 36. Potentiometer 38 extends across the full vertical dimension of the chart and has impressed across it a voltage proportional to the chart distance it spans, in accordance with the voltage distance scale. A cursor 40 is mounted on the lead screw 36 and carries a stylus or inking wheel 42 and a contact 44. The inking wheel or stylus 42 travels along the surface of the chart 10 and indicates thereon the position of the craft. The contact 44 is in sliding contact with the potentiometer 38 and is connected to the computer 17 by means of a flexible lead 46. The motor 26 is the Y motor and is connected to motor amplifier circuit 21 by flexible lead 25. The voltage applied to the motor 24 through lead 23 drives that motor in a direction to advance the cursor 40 toward the line defined by the X coordinate of the craft's position. As the contact 34 moves along the potentiometer 30 during this travel, the voltage it intercepts along the potentiometer is fed back to the computer 17 in a sense to reduce the voltage applied to the motor 24. Thus as cursor 40 reaches the line defined by the X coordinate, the voltage will reduce to zero and motor 24 will stop.

Likewise the voltage applied to the Y motor 26 through the lead 25 will cause that motor to drive the stylus 42 to a position in which it intercepts the line defined by the Y coordinate of the position of the craft on the chart 10, the voltage intercepted by the contact 44 being fed back to the computer 17 to bring the stylus to rest in that position.

The computer 17 operates to solve electrically from the information supplied to it from the automatic direction finders 12 and 13 and compass 14, certain trigonometric equations deriving the values of the coordinates X and Y of the position of the craft from that information. Before proceeding to a detailed discussion of the construction and operation of the computer 17, the derivation of the trigonometric formulas upon which the computer 17 operates will first be discussed.

Figure 2:
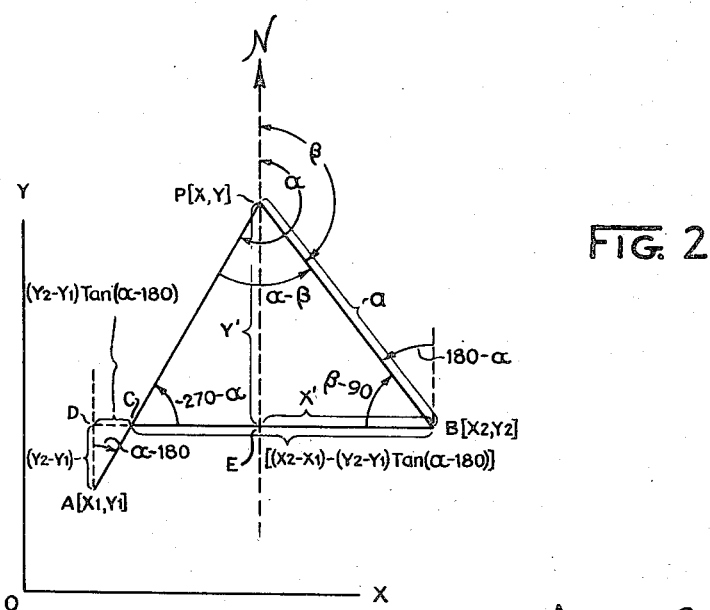
Fig. 2 is a diagram illustrative of certain trigonometric relationships utilized in carrying out the invention.

Figure 2 illustrates the trigonometric relationships existing between the points A and B which represent the locations of the radio transmitting stations, and the true bearings of those stations with respect to the craft, from which relationships the location of the craft at point P may be derived in terms of its rectangular coordinates. The rectangular coordinates are referred to a zero point arbitrarily selected at the lower left hand corner of the chart.

A vertical is erected through the point P to represent the meridian. The points P and A, P and B are connected. The third side of a triangle is formed by a line from the point B normal to the meridian and terminating in the line PA at point C. The line BC is extended to intercept in point D a vertical erected at A. The point where line BC intersects the meridian is indicated as E. Then the line PE is the altitude of triangle PBC and is designated as Y', the line BE being indicated X'. The line PB is designated $a$.

Designating the true bearing angle of station A as $\alpha$ and that of station B as $\beta$, then $$BC = (X_2 - X_1) - (Y_2 - Y_1) \tan(\alpha - 180°)$$

$DC = (Y_2 - Y_1) \tan(\alpha - 180°)$ and $DA = Y_2 - Y_1$.

Proceeding now with the derivation of the rectangular coordinates of point P, the following relationships may be noted by inspection of Figure 2.

(1) $\qquad X = X_2 - X'$ (2) $\qquad Y = Y_2 + Y'$ (3) $\qquad X' = a \cos(\beta - 90)$ (4) $\qquad Y' = a \sin(\beta - 90)$ Continuing from Equations 1 and 2 to the solution for X; by the law of sines:

(5)
$$\frac{a}{\sin(270° - \alpha)} = \left[\frac{(X_2 - X_1) - (Y_2 - Y_1)\tan(\alpha - 180°)}{\sin(\alpha - \beta)}\right]$$

Multiplying by $\sin(270 - \alpha)$:

(6)
$$a = \frac{\sin(270° - \alpha)}{\sin(\alpha - \beta)}[(X_2 - X_1) - (Y_2 - Y_1)\tan(\alpha - 180°)]$$

Rewriting Equation 3

(7) $\qquad a = \dfrac{X_1}{\cos(\beta - 90°)}$

Representing the expression $[(X_2 - X_1) - (Y_2 - Y_1) \tan(\alpha - 180°)]$ as [F], and substituting (7) in (6), the following is obtained:

(8) $\qquad \dfrac{X_1}{\cos(\beta - 90°)} = \dfrac{\sin(270° - \alpha)}{\sin(\alpha - \beta)}[F]$ Multiplying (8) by $\cos(\beta - 90°)$:

(9) $\qquad X_1 = \dfrac{\cos(\beta - 90°) \sin(270° - \alpha)}{\sin(\alpha - \beta)}[F]$ Substituting (9) in (1):

(10) $\qquad X = X_2 - \dfrac{\cos(\beta - 90°) \sin(270° - \alpha)}{\sin(\alpha - \beta)}[F]$ which may be written:

(11) $\qquad X = X_2 - \dfrac{\sin \beta \sin(270° - \alpha)}{\sin(\alpha - \beta)}[F]$ which may likewise be written:

(12) $\qquad X = X_2 + \dfrac{\sin \beta \cos \alpha}{\sin(\alpha - \beta)}[F]$

Substituting the equivalent expression for [F], (12) becomes:

(13)
$$X = X_2 + \frac{\sin \beta \cos \alpha}{\sin(\alpha - \beta)}[(X_2 - X_1) - (Y_2 - Y_1) \tan(\alpha - 180°)]$$

Substituting $\tan \alpha$ for $$\frac{\sin(\alpha - 180°)}{\cos(\alpha - 180°)}$$

(14)
$$X = X_2 + \frac{\sin \beta \cos \alpha}{\sin(\alpha - \beta)}[(X_2 - X_1) - (Y_2 - Y_1) \tan \alpha]$$

which may be written:

(15)
$$X = X_2 + \frac{\sin \beta \cos \alpha}{\sin(\alpha - \beta)}\left[\frac{(X_2 - X_1)\cos \alpha - (Y_2 - Y_1)\sin \alpha}{\cos \alpha}\right]$$

or:

(16)
$$X = X_2 + \frac{\sin \beta}{\sin(\alpha - \beta)}[(X_2 - X_1)\cos \alpha - (Y_2 - Y_1)\sin \alpha]$$

Changing two signs in the right hand expression:

(17)
$$X = X_2 + \frac{\sin \beta}{\sin(\alpha - \beta)}[(X_2 - X_1)\cos \alpha + (Y_1 - Y_2)\sin \alpha]$$

Figure 4:
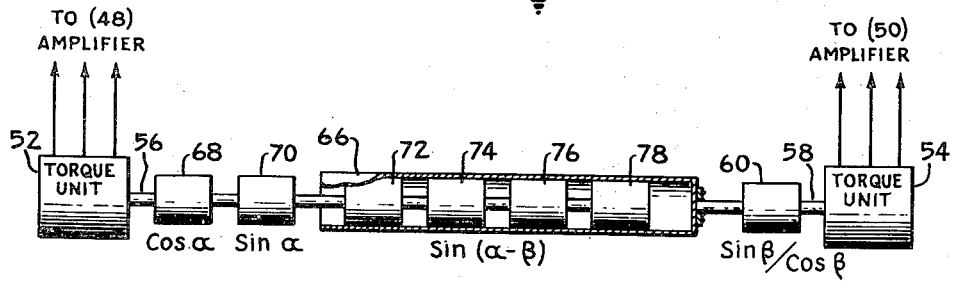
Fig. 4 is a schematic diagram of a portion of the system illustrated in Fig. 3, showing the mechanical relationships of certain elements of the system.

Multiplying by $\sin(\alpha - \beta)$:

(18) $X \sin(\alpha - \beta) = X_2 \sin(\alpha - \beta) +$
$\qquad \sin \beta[(X_2 - X_1) \cos \alpha + (Y_1 - Y_2) \sin \alpha]$ Since it is desired to reach equilibrium when the stylus has reached the position of the craft, the equation should be rewritten to equal zero, as follows:

(19) $O = -X \sin(\alpha - \beta) + X_2 \sin(\alpha - \beta) +$
$\qquad \sin \beta[(X_2 - X_1) \cos \alpha + (Y_1 - Y_2) \sin \alpha]$ The solution for Y from Equations 2 and 4 will be obvious from the solution for X given above and will not be set forth. The resulting equation when set to equal zero is as follows:

(20) $O = -Y \sin(\alpha - \beta) + Y_2 \sin(\alpha - \beta) +$
$\qquad \cos \beta[(X_2 - X_1) \cos \alpha + (Y_1 - Y_2) \sin \alpha]$ Figure 4 shows in schematic form the structure of the computer 17 which solves the two Equations 19 and 20.

The differential "Autosyn" 15 receives input voltages from automatic direction finder 12 and compass 14 as indicated in Figure 3 and combines them differentially to produce an output voltage proportional to the angle $\alpha$. This voltage is amplified in amplifier 48 also shown in Fig. 3, and applied to the torque amplifier unit 52 of known construction in order to develop sufficient torque to drive a plurality of sine and cosine resolvers which will be described later.

The differential "Autosyn" 16 receives the outputs of automatic direction finder 13 and compass 14 as shown in Fig. 3 and differentially combines them to produce an output voltage proportional to the angle $\beta$. This voltage is amplified in amplifier 50 of Fig. 3 and applied to torque amplifier 54 which is similar to torque amplifier 52 and operates for the same purpose.

Sine and cosine resolvers are devices known to the art in which a voltage output is produced proportional to the sine or cosine of the angular movement of a shaft. The shaft carries a rotor winding which rotates inside a stator winding, the windings being so related that rotation of the shaft varies the coupling therebetween in a manner to produce the desired sine or cosine output.

The shaft 56 driven by the torque amplifier 52 carries rotor windings associated with resolver units 68, 70, 72, 74, 76 and 78. The stator winding of resolver 68 is arranged to provide a cosine output and that of resolver 70 to produce a sine output. Thus the output of resolver 68 is proportional to cos $a$ and that of resolver 70 is proportional to sin $a$.

The shaft 58 driven by the torque amplifier 54 carries a rotor winding associated with resolver 60. This resolver has two stator windings, one of which provides an output proportional to sin $\beta$ and the other an output proportional to cos $\beta$. The shaft 58 also drives a cylinder 66 which is fitted over and fixed in driving relation, to the stators of resolvers 72, 74, 76 and 78, thus producing a total relative movement between the rotor and stator windings of these resolvers which is proportional to $(a-\beta)$. These resolvers are all wound for sine outputs.

Figure 5:
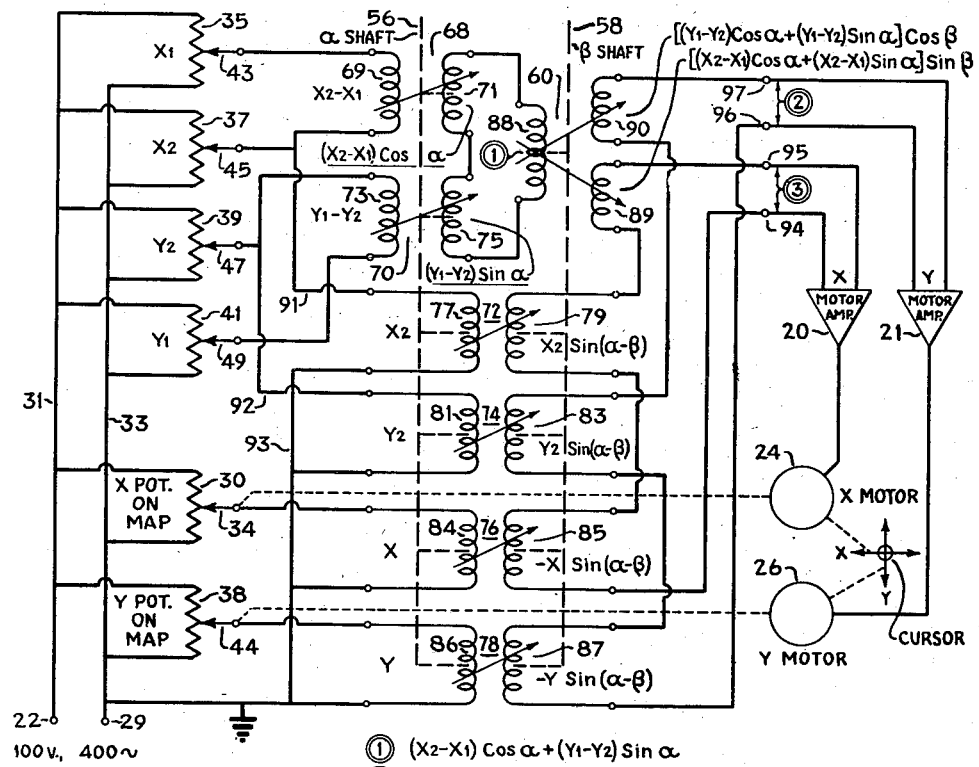
Fig. 5 is a schematic diagram of circuits utilized in the computer of the system of Fig. 3.
Figure 6:
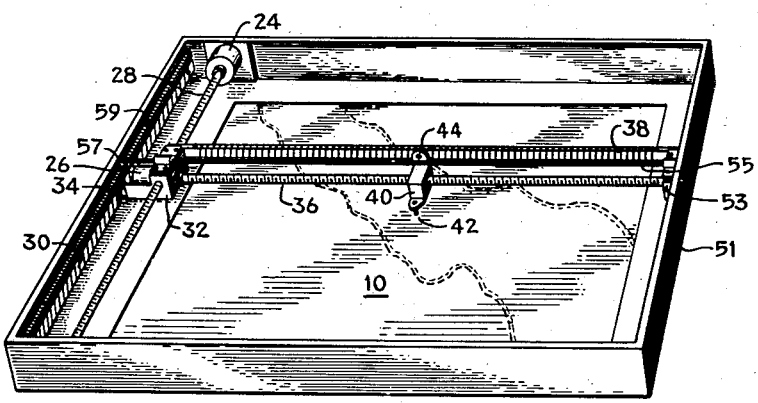
Fig. 6 is a bottom plan view of a practical embodiment of the mechanical portion of the system shown schematically in Fig. 3, showing a chart mounted in a frame and means driving a position indicating stylus in accordance with the rectangular coordinates of the position of the craft as derived by the system.

Figure 5 illustrates schematically the circuits utilized in the computer 17. Operating voltage is applied at terminals 22 and 29 to a pair of leads 31 and 33, across which are connected potentiometers 35, 37, 39, 41, 30 and 38. The operating voltage is shown as 100 volts at a frequency of 400 cycles. These voltage values are not critical, being merely shown by way of example, the magnitude of the voltage being determined by the lateral dimensions of the chart and the voltage distance scale adopted. The potentiometers 30 and 38 are the X and Y potentiometers respectively, which are shown in Figures 3 and 6. The potentiometers 35, 37, 39 and 41 are the $X_1$, $X_2$, $Y_2$ and $Y_1$ potentiometers respectively, the tapped points of which are adjusted to provide voltages proportional to the rectangular coordinates of the stations A and B. The shaft 56 illustrated in Figure 4 is represented as a dashed line driving the rotors of resolvers 68, 70, 72, 74, 76 and 78. The shaft 58 of Figure 4 is represented as a dashed line driving the rotor of resolver 60 and also driving the stators of resolvers 72, 74, 76 and 78.

The terminals of stator winding 69 of resolver 68 are connected to the tapped points 43 and 45 respectively of potentiometers 35 and 37, whereby the winding 69 has impressed across it a voltage equal to $X_1-X_2$. The terminals of stator winding 73 of resolver 70 are connected to the tapped points 47 and 49 respectively of potentiometers 39 and 41, whereby the winding 73 has impressed across it a voltage equal to $Y_2-Y_1$. The rotor winding 71 of resolver 68 is cosine wound and the rotor winding 75 of resolver 70 is sine wound. The rotor winding 71 and 75 are connected in series, their free terminals being connected across the terminals of rotor winding 88 of resolver 60, thus applying to rotor winding 88 a voltage equal to the expression $(X_1-X_2)$ cos $a+(Y_2-Y_1)$ sin $a$. Stator winding 89 of resolver 60 is sine wound with the result that a voltage is developed across it which is equal to $[(X_1-X_2)$ cos $a+(Y_2-Y_1)$ sin $a]$ sin $\beta$. The rotor winding 77 of resolver 72 has one of its terminals connected to the tapped point 45 of the $X_2$ potentiometer 37 and its remaining terminal grounded through lead 93. The stator winding 79 of resolver 72 is sine wound and is driven by $\beta$ shaft 58 with the result that this winding has developed across it a voltage equal to X sin $(a-\beta)$. The rotor winding 84 of resolver 76 has one of its terminals connected to the tapped point 34 of X potentiometer 30 and its other terminal connected to ground. The stator winding 85 of resolver 76 is sine wound and driven by $\beta$ shaft 58, with the result that there is developed across it a voltage equal to $X$ sin $(a-\beta)$. The fixed stator winding 89 and the driven stator windings 79 and 85 are connected in series across the terminals 94 and 95 of X motor amplifier 20, the driven stator winding 85 being connected in a subtractive sense with respect to the other windings. The voltage applied to the terminals 94, 95 is thus related to the voltage across potentiometer X in accordance with the equation 19 as solved for the particular values of $a$, $\beta$, $X_1$, $X_2$, $Y_1$, and $Y_2$ applied to the computer.

The stator winding 90 of resolver 60 is cosine wound and thus develops across its terminals a voltage equal to the expression $[(X_1-X_2)$ cos $a+(Y_2-Y_1)$ sin $a]$ cos $\beta$. The rotor winding 81 of resolver 74 has one of its terminals connected by lead 92 to the tap 47 of $Y_2$ potentiometer 39. The other terminal of rotor winding 81 is grounded. Driven stator winding 83 of resolver 74 is sine wound and driven by the $\beta$ shaft 58 whereby the voltage developed across it is equal to the expression $Y_2$ sin $(a-\beta)$. The rotor winding 86 of resolver 78 has one of its terminals connected to the tap 44 of Y potentiometer 38 and its other terminal grounded. Driven stator winding 87 of resolver 78 is sine wound and is driven by the $\beta$ shaft 58, thereby developing across its terminals a voltage equal to the expression $Y$ sin $(a-\beta)$. The stator windings 90, 83 and 87 are connected in series across terminals 96 and 97 of the Y motor amplifier 21, the winding 87 being connected in a subtracting sense with respect to the other two. There is thus applied to the terminal 96, 97 a voltage related to the voltage across potentiometer Y in accordance with the equation 20 as solved for the particular values of $a$, $\beta$, $X_1$, $X_2$, $Y_1$, and $Y_2$ applied to the computer.

Figure 6 illustrates a practical embodiment of the position recording means driven by the computer 17 and shown schematically in Figure 3. There is shown a bottom perspective view of a square box 51 of rather shallow depth, having a square chart 10 supported on what is normally its uppermost surface. Various arrangements may be adopted for supporting the chart 10, as desired. The chart may be supported above a transparent square panel, on the underside of which the track of the vessel may be recorded. Conversely, the chart may be supported beneath and in contact with the transparent panel, the vessel's position being recorded directly upon the underneath side of the chart.

Supported within and near one corner of the box is the X motor 24 and the lead screw 28 driven thereby. This lead screw extends parallel to the horizontal edges of the chart 10. The potentiometer 30 is supported along the side of the box in parallelism with the lead screw 28 and adjacent thereto. Supported on the lead screw 28 is the cursor 32 carrying the Y motor 26 and the lead screw 36 driven thereby. The potentiometer 38 is also supported by the cursor 32 in proximity and in parallelism with the lead screw 36. The opposite ends of the lead screw 36 and the potentiometer 38 are supported by a traveling block 53. Journaled in the cursor 32 and the traveling block 53 is a rod 55 each end of which is provided with a roller 57 fixed thereto, which rollers roll in tracks 59 provided along the opposite sides of the box 51. The tracks are provided with identical racks which mesh with teeth formed in the peripheries of the rollers, in a manner known to the art, for the purpose of insuring parallelism of movement of the lead screw 36 and potentiometer 38. Supported on the lead screw 36 and driven thereby is a cursor 40 carrying a stylus 42 provided with a pen point or inking wheel which makes contact with the chart 10. Also supported on the cursor 40 and traveling therewith is a contact 44 which travels along potentiometer 38. For purposes of clarity the electrical leads to the motor and to the potentiometer and its contacts have been omitted.

While the previously described embodiment of the invention is concerned with the determination of the rectangular coordinates of the position of the craft from the bearings of a pair of known stations, the invention is also applicable to the determination of position from information as to the bearing of the craft with respect to a single known station and the distance between the craft and the station.

Such information may be obtained in a manner known to the art. For example, the station may be of the responder beacon type employing an omni-directional range transmitter. The distance may be determined by the use of a pulse-type distance indicator known to the art.

Figure 7 illustrates a chart or map 110 similar to the chart 10 of Figure 1. A beacon station A' is indicated thereon. The position of the craft is indicated by the small figure of an aircraft 111. The rectangular coordinates of the craft and the station, as referred to a zero point arbitrarily taken at the lower left hand corner of the chart, are indicated by the arrows X, Y, $X_1$ and $Y_1$, respectively. A meridian indicating arrow is erected through station A' and the bearing line between the craft and station is indicated by a line joining the two, the length of the line being represented as $d$ and the true bearing angle as $a$.

By inspection of the figure, the following trigonometric relationships are apparent:

(21)     $X = X_1 + d \sin a$
(22)     $Y = Y_1 + d \cos a$

Setting these equations equal to zero:

(23)     $O = X_1 - X + d \sin a$
(24)     $O = Y_1 - Y + d \cos a$

Figure 8 shows schematically the electrical circuits of a computer for solving these equations from the data given, by the generation of voltages equivalent to the rectangular coordinates of the position of the craft in terms of an arbitrary voltage-distance ratio, which may be that selected for the previous embodiment. With these voltages are combined the follow-up voltages intercepted by the movement of the position indicating means as in the previous embodiment.

Operating voltage is applied at terminals 122 and 129 to a pair of leads 131 and 133, across which are connected potentiometers 112, 35, 30, 41 and 38. The potentiometers 30 and 38 are the X and Y map potentiometers previously described, and potentiometers 35 and 41 are the $X_1$ and $Y_1$ potentiometers previously referred to. The potentiometer 112 supplies a voltage representative of the distance $d$.

The setting of this potentiometer may be by hand or may be automatically applied by known means from the output of the distance determining means.

A sine cosine resolver 116 has a rotor winding 118 driven by a shaft 156 represented as a dashed line. This shaft is manually rotated to the correct angular setting corresponding to the bearing angle $a$. The resolver is provided with a cosine wound stator winding 120 and a sine wound stator winding 122.

One terminal of rotor winding 118 is connected to the tap 114 of the potentiometer 112, the other terminal being grounded, thus applying a voltage equivalent to $d$ across the winding. The taps 43 and 34 of potentiometer 35 and 30 respectively are connected to opposite terminals of primary 117 of one to one transformer 115, thus applying across it a voltage equivalent to $(X_1 - X)$. One terminal of secondary 119 is connected to stator winding 122 of resolver 116, the output of which is equivalent to $$X_1 - X + d \sin a$$

and is applied through lead 128 to X motor amplifier 20.

The taps 49 and 44 of potentiometers 41 and 38 respectively are connected to the opposite terminals of primary 123 of one to one transformer 121, thus applying across it a voltage equivalent to $Y_1 - Y$. One terminal of secondary 125 is connected to stator winding 120, the output of which is equal to $Y_1 - Y + d \cos a$. This output is applied to the Y motor amplifier 21 through lead 124;

The remainder of the system following the motor amplifiers 20 and 21 may be the same as in the first described embodiment.

While but two embodiments of the invention have been disclosed, many changes of form and arrangement falling within the scope of the invention as defined by the appended claims will suggest themselves to those skilled in the art. It is therefore to be understood that the scope of the invention is not to be limited to the embodiment disclosed herein.

What is claimed is:

1. A device for indicating the position of a mobile craft upon a chart of the area in which it is located by the use of bearing angles of a plurality of points of known location in said area comprising: a position marking means; a pair of voltage responsive driving means for driving said marking means across said chart in mutually perpendicular directions; a pair of direction finders; a compass; a source of voltage; means operable to derive from said source, voltages which are functions of the rectangular coordinates of said points; means differentially combining the output of said direction finders and said compass; means driven in accordance with said combined outputs to modify said derived voltages in accordance with functions of the true bearings of said points from said craft, thereby producing resultant voltages having magnitudes which are commensurate with the rectangular coordinates of the position of said craft in terms of a selected voltage distance ratio; means applying said resultant voltages to said driving means; and follow-up means reducing said resultant voltages as said position marking means approaches the location on said chart representative of the location of said craft in said area.

2. A device for indicating the position of a mobile craft upon a chart of the area in which it is located by the use of the bearing and distance of a point of known location in said area comprising: a position marking means; a direction finder; a distance determining means; a source of voltage; a compass; a pair of voltage responsive driving means for driving said marking means across said chart in mutually perpendicular directions; means operable to derive from said source, voltages which are functions of the rectangular coordinates of said point; means differentially combining the output of said direction finder and said compass; means driven in accordance with said combined outputs and the output of said distance determining means to modify said derived voltages in accordance with functions of the true bearing and distance of said point from said craft, thereby producing resultant voltages having magnitudes which are commensurate with the rectangular coordinates of the position of said craft in terms of a selected voltage distance ratio; means applying said resultant voltages to said driving means; and follow-up means reducing said resultant voltages as said position marking means approaches the location on said chart representative of the location of said craft in said area.

ARTHUR C. OMBERG.

REFERENCES CITED

The following references are of record in the file of this patent:

UNITED STATES PATENTS

| Number | Name | Date |
| --- | --- | --- |
| 736,557 | Shoemaker | Aug. 18, 1903 |
| 1,154,252 | Kennedy | Sept. 21, 1915 |
| 1,450,410 | Cox | Apr. 3, 1923 |
| 1,785,241 | Bates | Dec. 16, 1930 |
| 2,070,178 | Pottenger, Jr. et al. | Feb. 9, 1937 |
| 2,080,186 | Reymond | May 11, 1937 |
| 2,395,351 | Sohn | Feb. 19, 1946 |
| 2,406,836 | Holder | Sept. 3, 1946 |
| 2,443,604 | Dehmal | June 22, 1948 |
| 2,472,129 | Streeter, Jr. | June 7, 1949 |

FOREIGN PATENTS

| Number | Country | Date |
| --- | --- | --- |
| 767,965 | France | Mar. 7, 1934 |